United States Patent [19]

Arai

[11] Patent Number: 4,945,207
[45] Date of Patent: Jul. 31, 1990

[54] ASSIST GAS CONTROL METHOD

[75] Inventor: Takeji Arai, Yamanashi, Japan

[73] Assignee: Fanuc Ltd., Minamitsuru, Japan

[21] Appl. No.: 332,936

[22] PCT Filed: Aug. 10, 1988

[86] PCT No.: PCT/JP88/00792

§ 371 Date: Mar. 21, 1989

§ 102(e) Date: Mar. 21, 1989

[87] PCT Pub. No.: WO89/01386

PCT Pub. Date: Feb. 23, 1989

[30] Foreign Application Priority Data

Aug. 12, 1987 [JP] Japan ................... 62-201599

[51] Int. Cl.$^5$ ........................................ B23K 26/00
[52] U.S. Cl. ..................... 219/121.84; 219/121.72; 219/121.64; 219/121.85
[58] Field of Search .......... 219/121.6, 121.85, 121.67, 219/121.72, 121.84, 121.63, 121.64; 364/474.08

[56] References Cited

U.S. PATENT DOCUMENTS 4,319,120  3/1982  La Rocca ................... 219/121.84

FOREIGN PATENT DOCUMENTS

| 0003913 | 1/1985 | Japan | 219/121.84 |
| 0121097 | 6/1985 | Japan | 219/121.84 |
| 0216985 | 10/1985 | Japan | 219/121.84 |
| 2163692 | 3/1986 | United Kingdom | 219/121.84 |

*Primary Examiner*—C. L. Albritton
*Attorney, Agent, or Firm*—Staas & Halsey

[57] ABSTRACT

An assist gas control method is provided for a CNC laser machining device including a combination of a laser beam machine and a numerical control apparatus (CNC). The kind, mixing ratio, pressure, and flow rate of a assist gas are controlled by instructions from a machining program, and a numerical control apparatus (10) controls the kind, mixing ratio, pressure and flow rate of the assist gas by controlling a flow rate control valve (32), a pressure control valve (33), and other components, to perform laser machining. Since the kind, mixing ratio, pressure, and flow rate of the assist gas are controlled by the instructions from the machining program and are controlled automatically, an operator is not required to select, set or adjust the assist gas, whereby the preparation time for machining is shortened and laser machining can be carried out with a satisfactory precision.

6 Claims, 3 Drawing Sheets

|  | $P_w$ | $P_p$ | $t_p$ | $P_a$ | $t_a$ |
|---|---|---|---|---|---|
| Q1 | $P_w 1$ | $P_p 1$ | $t_p 1$ | $P_a 1$ | $t_a 1$ |
| Q2 | $P_w 2$ | $P_p 2$ | $t_p 2$ | $P_a 2$ | $t_a 2$ |
| ⋮ | ⋮ | ⋮ | ⋮ | ⋮ | ⋮ |
| ⋮ | ⋮ | ⋮ | ⋮ | ⋮ | ⋮ |
| $Q_n$ | ⋮ | ⋮ | ⋮ | ⋮ | ⋮ |

FIG. 3

ASSIST GAS CONTROL METHOD

BACKGROUND OF THE INVENTION

The present invention relates to an assist gas control method for a CNC laser machining device including a combination of a laser beam machine and a numerical control apparatus (CNC), and more particularly, to an assist gas control method in which instructions for assist gas control are supplied by a machining program for carrying out machining.

DESCRIPTION OF THE RELATED ART

CNC laser machining devices comprising a combination of a laser beam machine and a numerical control apparatus (CNC) are now in practical use, and since the function of the numerical control apparatus (CNC), in particular, allows a workpiece having a complex shape to be machined at a high speed, the CNC laser machining devices are used not only for cutting metal but also for surface treatment of the metal, such as welding, alloying of a metal surface, amorphous treatment of a metal surface, and the like.

An assist gas is widely used in metal machining to prevent contamination of the lens of the laser machining device, protect the workpiece from machining splash, promote the machining of the metal, and the like.

In this operation, however, the kind, pressure, and flow time of the assist gas are selected, set, and adjusted by an operator in charge of the machining, according to working instructions or based on the operator's judgment. Therefore, problems arise in that a considerable time is required actually before starting laser machining and in that a defective machining may occur due to, for example, an error by the operator.

SUMMARY OF THE INVENTION

An object of the present invention is to provide an assist gas control method which solves the above problems and in which instructions for an assist gas control are supplied by a machining program for carrying out the machining.

To solve the above problems, a first embodiment provides an assist gas control method for a CNC laser machining device including a combination of a laser beam machine and a numerical control apparatus (CNC), the step of:

controlling or indicating a kind, mixing ratio, pressure, and flow rate of an assist gas based on instructions from a machining program; and automatically controlling the kind, mixing ratio, pressure, and flow rate of the assist gas by the numerical control apparatus, to effect laser machining.

A second embodiment provides an assist gas control method for a CNC laser machining device including a combination of a laser beam machine and a numerical control apparatus (CNC), comprising the steps of:

controlling or indicating a pressure and flow time of a pre-flow of an assist gas and a pressure and flow time of a post-flow of the assist gas based on instructions from a machining program; and automatically controlling the pressure and flow time of the pre-flow before machining and the pressure and flow time of the post-flow after machining by the numerical control apparatus, to effect laser machining.

A third embodiment provides an assist gas control method for a CNC laser machining device including a combination of a laser beam machine and a numerical control apparatus (CNC), comprising the steps of:

controlling or indicating a kind, mixing ratio, pressure, and flow rate of an assist gas, a pressure and flow time of a pre-flow of the assist gas, and a pressure and flow time of a post-flow of the assist gas based on instructions from a machining program; and automatically controlling the kind, mixing ratio, pressure and flow rate of the assist gas, the pressure and flow time of the pre-flow, and the pressure and flow time of the post-flow by the numerical control apparatus, to effect laser machining.

The kind, mixing ratio, pressure, and flow rate of the assist gas are controlled by instructions from the machining program, and thus the assist gas is controlled automatically, whereby the operator need not select, set or adjust the assist gas.

Furthermore, the pressure and flow time of the assist gas pre-flow before machining and the pressure and flow time of the assist gas post-flow after machining are controlled by the machining program. Therefore, the pre-flow and post-flow are controlled automatically, and thus the operator need not set or adjust the pre-flow and post-flow.

The kind, mixing ratio, pressure, and flow rate of the assist gas, and the pressures and times for the pre-flow and post-flow of the assist gas are controlled by the instructions from the machining program, and thus all of the assist gas control operations are executed automatically. Therefore, the operator is not required to do any setting and adjusting, etc., of the assist gas.

BRIEF DESCRIPTION OF THE DRAWINGS

FIG. 3 is a diagram illustrating a data table for the assist gas.

DESCRIPTION OF THE PREFERRED EMBODIMENTS

An embodiment of the present invention will be described with reference to the drawings.

Figure 1:
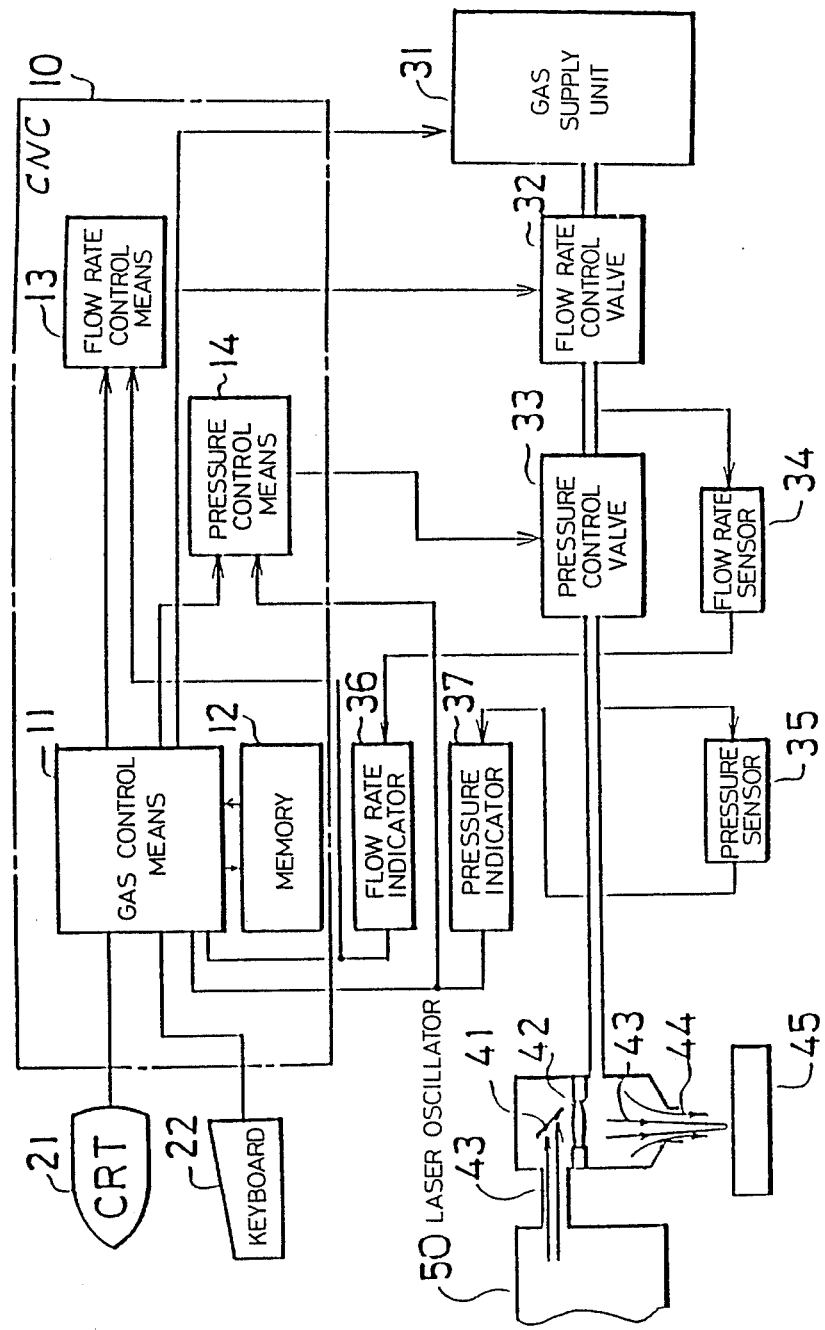
FIG. 1 is a block diagram illustrating an embodiment of the present invention.

FIG. 1 is a block diagram illustrating an embodiment of the present invention. In the figure, 10 represents a computer numerical control apparatus (CNC) for controlling laser machining. Note, the figure shows only the portions pertinent to assist gas control and those parts relating to control of various axes and a laser oscillator are omitted. Numeral 11 denotes gas control means for controlling the flow rate and pressure, etc., of the assist gas, referred to hereinafter, 12 denotes a memory for storing a machining program and parameters, etc., for laser machining, 13 flow rate control means for controlling the flow rate of the assist gas, and 14 pressure control means for controlling the pressure of the assist gas.

Numeral 21 designates a display for displaying the flow rate and pressure, etc., of the assist gas in accordance with instructions from the gas control means 11. A CRT or liquid-crystal display may be used as the display 21. Designated at 22 is a keyboard by which data, such as the kind, pressure, and flow rate, etc., of the assist gas, is input. The input data is stored in the memory 12, and is read out during laser machining.

A machining program is read out by a tape reader, not shown, or is input through the keyboard 22, and is stored in the memory 12. When carrying out machining, the data is read out and output by the gas control means 11 as instructions specifying the kind, flow rate, and pressure, etc., of the assist gas.

Numeral 31 represents a gas supply unit including gas cylinders containing assist gases, valves for selectively delivering the gases, a mixing machine for mixing various assist gases, and other components. In accordance with instructions from the gas control means 11, the kind and mixing ratio of the assist gas are defined, and related solenoid valves are controlled to deliver an assist gas as instructed.

Designated at 32 is a flow rate control valve, the opening of which is controlled by a voltage instruction from the flow rate control means 13 to control the flow rate of the assist gas. Numeral 33 designates a pressure control valve, the opening of which is controlled by a voltage instruction from the pressure control means 14 to control the pressure of the assist gas.

Denoted at 34 is a flow sensor for detecting the flow rate of the assist gas at the output side of the flow rate control valve 32, and 35 denotes a pressure sensor for detecting the pressure at the output side of the pressure control valve 33.

Numeral 36 designates a flow rate indicator, which receives a voltage output from the flow sensor 34 and amplifies the same to be displayed on a display incorporated therein. At the same time, the voltage signal is converted into a digital signal by the indication 36, which is output to the gas control means 11. The gas control means 11 supplies the signal to the display 21, which then displays the flow rate of the assist gas. The digital signal is also supplied to the flow rate control means 13, which compares the digital signal from the flow rate indicator 36 with an instruction value from the gas control means 11, and controls the flow rate control valve 32 such that the flow rate of the assist gas becomes equal to the instruction value.

Numeral 37 denotes a pressure indicator, which receives a voltage output from the pressure sensor 35 and amplifies the same to be shown on a display incorporated therein. Simultaneously, the pressure indicator 37 converts the voltage signal into a digital signal, which is supplied to the gas control means 11. The gas control means 11 supplies the signal to the display 21, to cause a display of the pressure of the assist gas thereon, and to the pressure control means 14. The pressure control means 14 compares the digital signal from the pressure indicator 37 with an instruction value from the gas control means 11, and controls the pressure control valve 33 such that the pressure of the assist gas becomes equal to the instruction value.

Numeral 41 denotes a reflection mirror for reflecting a laser beam 43 from a laser oscillator 50 toward a lens 42. The lens 42 focuses the laser beam 43, reflected by the reflection mirror 41, onto a workpiece 45. Denoted at 44 is an assist gas which protects the lens 42 from splashes produced during machining and facilitates the machining of the workpiece 45.

Now, an example of a machining program will be described. The instruction from the machining program is formatted as follows:

G32 P1 Q2;

where "G32" is the G code for controlling the assist gas, and "P1" indicates the kind of assist gas, which, for example, can be defined as follows:

P0 ... stoppage of assist gas
P1 ... oxygen
P2 ... nitrogen
P3 ... air
P4 ... argon The gas used may be a mixture of these gases, if necessary.

"Q2" is data read from machining data tables previously stored in the memory 12, and indicates the pressure and flow rate, etc., of the assist gas. These tables are prepared beforehand in accordance with the material and thickness of a workpiece to be machined, and the kind of machining, such as cutting, welding, surface treatment (alloying or amorphous treatment of metal surface) or the like.

The pre-flow and post-flow used in laser machining will now be described. During laser machining, the assist gas must flow not only during the actual machining but also before and after the machining, for predetermined time periods, regardless of whether cutting, welding or a surface treatment is to be carried out. The flow of assist gas before machining is called a pre-flow, and the flow after machining is called a post-flow.

Figure 2:
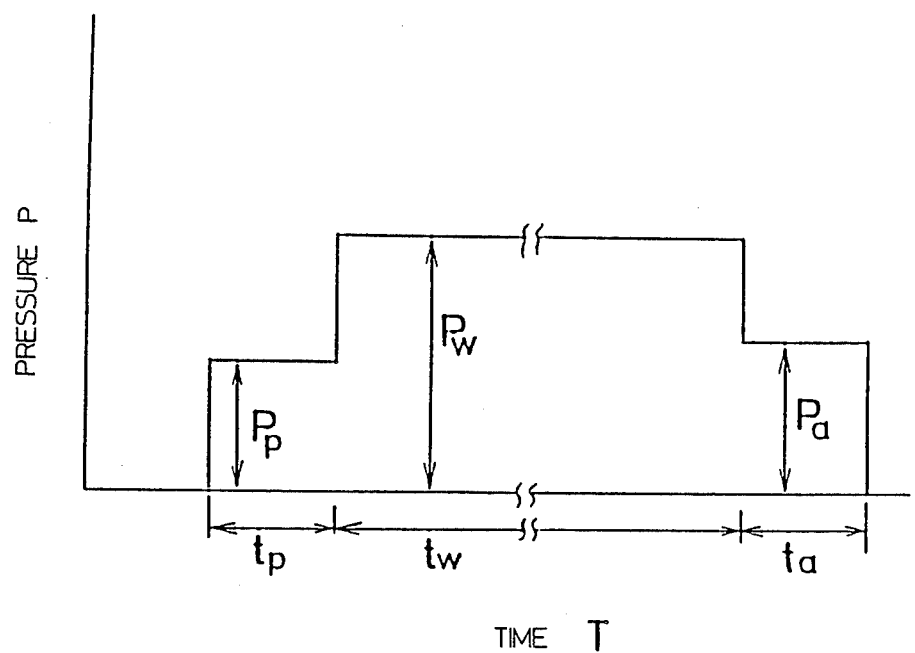
FIG. 2 is a diagram showing the relationship between time and pressure of pre-flow gas and post-flow.

FIG. 2 shows the relationship between the time and pressure of the pre-flow gas and post-flow. In the figure, time is indicated along the abscissa, and the pressure of the assist gas along the ordinate. Time tw represents the actual machining time, and in this case, the pressure of the assist gas is Pw. During a time tp before machining, a pre-flow of assist gas with a pressure Pp is produced, and during a time ta after machining a post-flow is produced with a pressure Pa. Of these values, the machining time tw is determined by actual workpiece machining, whereas the other data is previously stored, as machining data, in the memory 12, in specified locations depending on the material and thickness, etc., of the respective workpieces. The data is denoted by Q and a numerical suffix, and is read out in the machining program as an instruction, such as "Q2", to perform machining.

FIG. 3 shows an example of the table. The data in the table is denoted by the numerical which is a suffix to Q, and represents the pressure and time for the corresponding assist gas. The data must be previously obtained by measurement and stored in the memory 12.

In the foregoing description, the data for the assist gas is stored together in the table to be read afterwards; alternatively it may be output from the program as an independent instruction, as in the case of the kind of assist gas, if necessary.

As described above, in the present invention, the kind, mixing ratio, pressure, and flow rate of the assist gas are controlled by instructions from the machining program, and thus the assist gas is automatically controlled. Therefore, the operator need not select, set, or adjust the assist gas, and thus the preparation time for machining is shortened and setting and adjustment errors are eliminated.

Furthermore, the pressure and flow time of the assist gas pre-flow before machining and the pressure and flow time of the assist gas post-flow after machining are controlled by the instructions from machining program to automatically control the pre-flow and post-flow. Therefore, the operator is not required to set and adjust the pre-flow and post-flow, and thus the preparation time for machining is shortened and setting and adjustment errors are eliminated.

The kind, mixing ratio, pressure, and flow rate of the assist gas and the pressure and time for the pre-flow and post-flow ar controlled by the instructions from the machining program to carry out the entire assist gas control automatically. The operator therefore need do nothing about the setting and adjustment, etc. of the assist gas, whereby the preparation time for machining is reduced, errors occurring when setting and adjusting the assist gas are eliminated, and machining suited to the material, thickness and other machining conditions can be carried out.

I claim:

1. An assist gas control method for a laser machining device including a combination of a laser beam machine and a numerical control apparatus, comprising the steps of:
   indicating a kind, mixing ratio, pressure, and flow rate of an assist gas via instructions in a machining program; and
   automatically controlling the kind, mixing ratio, pressure, and flow rate of the assist gas using said numerical control apparatus during laser machining operations.

2. An assist gas control method for a laser machining device including a combination of a laser beam machine and a numerical control apparatus, comprising the steps of:
   indicating a pressure and flow time of a pre-flow of an assist gas and a pressure and flow time of a post-flow of the assist gas via instructions in a machining program; and
   automatically controlling the pressure and flow time of the pre-flow of the assist gas before machining and the pressure and flow time of the post-flow of the assist gas after machining using said numerical control apparatus during laser machining operations.

3. An assist gas control method for a laser machining device including a combination of a laser beam machine and a numerical control apparatus, comprising the steps of:
   indicating a kind, mixing ratio, pressure, and flow rate of an assist gas during machining, a pressure and flow time of a pre-flow of the assist gas prior to machining, and a pressure and flow time of a post-flow of the assist gas after machining via instructions in a machining program; and
   automatically controlling the kind, mixing ratio, pressure and flow rate of the assist gas during machining, the pressure and flow time of the pre-flow of the assist gas, and the pressure and flow time of the post-flow of the assist gas using said numerical control apparatus during laser machining operations.

4. A numerical control instruction for controlling an assist gas during laser machining, the instruction comprising:
   a field indicating an assist gas instruction;
   a field indicating a type and a mixture of the assist gas; and
   a field indicating a table entry for obtaining pressure, flow rate and time of flow of the assist gas based on characteristics of a workpiece and a type of machining.

5. An assist gas control method, comprising the step of numerically controlling one of a kind, a mixing ratio, a pressure and a flow rate of an assist gas during laser machining.

6. A method as recited in claim 5, further comprising numerically controlling one of a pressure and a flow time of the assist gas prior to laser machining and after laser machining.

* * * * *

UNITED STATES PATENT AND TRADEMARK OFFICE
CERTIFICATE OF CORRECTION

PATENT NO. : 4,945,207
DATED : July 31, 1990
INVENTOR(S) : Takeji ARAI

It is certified that error appears in the above-identified patent and that said Letters Patent is hereby corrected as shown below:

Front Page, under "ABSTRACT", line 6, "a" (first occurrence) s/b --an--.

Col. 1, line 8, "(CNC), and" s/b --(CNC) and,--;
      line 33, "actually before" s/b --before actually--;
      line 40, delete "an";
      line 47, before "the" insert --comprising--.

Col. 3, line 29, "indication" s/b --indicator--.

Col. 4, line 25, delete "gas" and after "post-flow" insert --gas--.

Col. 5, line 3, "ar" s/b --are--.

Signed and Sealed this

Twenty-fourth Day of December, 1991

Attest:

HARRY F. MANBECK, JR.

*Attesting Officer*      *Commissioner of Patents and Trademarks*